United States Patent [19]

Nakaya et al.

[11] Patent Number: 4,978,101
[45] Date of Patent: Dec. 18, 1990

[54] SOLENOID CONTROLLED VALVE OFR LIQUID PREPARATION

[75] Inventors: Toshitaka Nakaya, Fukui; Kenji Sumida, Tochigi, both of Japan

[73] Assignee: Washi Kosan Co., Ltd., Saitama, Japan

[21] Appl. No.: 340,727
[22] PCT Filed: Apr. 30, 1988
[86] PCT No.: PCT/JP88/00440
  § 371 Date: Dec. 27, 1988
  § 102(e) Date: Dec. 27, 1988
[87] PCT Pub. No.: WO88/08937
  PCT Pub. Date: Nov. 17, 1988

[30] Foreign Application Priority Data

May 2, 1987 [JP] Japan .................. 62-109458
Apr. 5, 1988 [JP] Japan .................. 63-84653

[51] Int. Cl.⁵ .......................................... F16K 31/10
[52] U.S. Cl. .............................. 251/129.15; 251/294; 251/339; 222/504; 222/529
[58] Field of Search ................ 251/294, 129.19, 339, 251/129.15, 129.07; 222/504, 529

[56] References Cited

U.S. PATENT DOCUMENTS 3,072,302  1/1963  Giovannoni et al. .......... 222/504 X
4,187,987  2/1980  Rave .......................... 251/129.15 X
4,463,659  8/1984  Nelson ......................... 251/294 X

FOREIGN PATENT DOCUMENTS 292049  6/1971  U.S.S.R. ............................. 251/294

Primary Examiner—Arnold Rosenthal
Attorney, Agent, or Firm—Jordan and Hamburg

[57] ABSTRACT

The valve unit of a solenoid controlled valve is disposed at the tip end of a tubular member which at a location remote from the tip end is connected to the plunger of the electromagnetic drive unit of the solenoid. A linear member inserted in and passing through the tubular member connects the plunger to the valve body of the valve unit. A liquid is conducted into the tubular member from a source. The solenoid controlled valve controls the flow of the liquid through the tubular member.

4 Claims, 4 Drawing Sheets

SOLENOID CONTROLLED VALVE OFR LIQUID PREPARATION

BACKGROUND OF THE INVENTION

The present invention relates to a solenoid controlled valve for liquid preparation in which an electromagnetic force drives the plunger to release the valve body from the valve seat, causing the valve to be opened or closed, thereby to control the flow of a liquid.

In a conventional solenoid controlled valve for liquid preparation, an electromagnetic drive unit including a plunger to be driven by an electromagnetic force generated by the coil, is disposed in the vicinity of a valve unit including a valve body pressingly contacted with the valve seat by a spring. The plunger of the electromagnetic drive unit is connected to the valve body of the valve unit by a valve rod having rigidity.

When using solenoid controlled valves for liquid preparation, it is required to gather, at one place, the tips of the pipes for supplying liquids used for preparation. Accordingly, the pipes have been conventionally extended to a long distance from the valve units of the solenoid controlled valves. When the pipes are extended to a long distance from the valve units, the liquids may remain in and stick to the insides of the pipes, thus failing to achieve an accurate preparation.

Further, when the valve unit is disposed in the vicinity of the electromagnetic drive unit, the heat of the coil is transferred to the valve body through the valve rod. Accordingly, some liquids to be controlled may be dried and solidified, due to this heat, between the valve seat and the valve body. This causes the liquid concentration to vary, failing to assure an accurate preparation.

In view of the foregoing, it is an object of the present invention to provide a solenoid controlled valve for liquid preparation in which the liquid does not remain in the liquid supply pipe and is not dried and solidifed at the valve unit, thus assuring an accurate liquid preparation.

SUMMARY OF THE INVENTION

To achieve the object above-mentioned, the solenoid controlled valve for liquid preparation in accordance with the present invention, comprises;
an electromagnetic drive unit including a plunger to be driven by an electromagnetic force of a coil; and
a valve unit separated from the electromagnetic drive unit and including a valve body pressingly contacted with a valve seat by a spring.

The electromagnetic drive unit and the valve unit are connected to each other by a tubular member, at the tip of which the valve unit is disposed. The valve body is connected to the plunger by a linear member inserted in and passing through the inside of the tubular member.

According to the solenoid controlled valve for liquid preparation of the present invention, the valve body and the plunger are connected to each other by the linear member. Accordingly, when an electromagnetic force acts on the plunger, causing the same to be driven, the valve body releases the valve seat to form a liquid passage. On the other hand, when the electromagnetic force does not act on the plunger, the valve body pressingly contacted with the valve seat by a spring closes the valve seat, thereby to close the liquid passage. Further, the electromagnetic drive unit and the valve unit are connected to each other by the tubular member, and the valve unit is disposed at the tip end of the tubular member. Accordingly, the liquid supply pipe connected to the valve unit may be shortened in length or even omitted. This prevents the liquid having passed through the valve unit, from remaining inside of the pipe, assuring an accurate liquid preparation.

According to the solenoid controlled valve for liquid preparation of the present invention, the electromagnetic drive unit and the valve unit are separated from each other, and the valve body and the plunger are connected to each other by the linear member. This prevents the heat of the coil at the electromagnetic drive unit from being easily transferred to the valve body of the valve unit. Thus, the liquid is not dried and solidified at the valve unit, further assuring an accurate liquid preparation.

The solenoid controlled valve for liquid preparation according to the present invention may be arranged such that the liquid flows inside of the tubular member and such liquid flow is controlled.

Such arrangement does not require to additionally dispose a pipe for guiding the liquid to the valve unit. Thus, the entire apparatus on which the solenoid controlled valve of the present invention is mounted, may be made in a compact design.

According to the present invention, the linear member may be flexible. When the plunger and the valve body are connected to each other by a flexible linear member, it is not required that the sliding direction of the plunger be coaxial with the moving direction of the valve body. Accordingly, even though the distance between the plunger and the valve body is long, the engagement of the valve body with the valve seat is always assured. This enables the fluid to be perfectly sealed. Further, the distance and the plane positional relationship between the plunger and the valve body may be selected as desired. This permits the valve unit to be arbitrarily disposed regardless of the plunger position. Thus, the solenoid controlled valve for liquid preparation may be compactly disposed in the apparatus.

According to the present invention, the tubular member may be flexible. With the use of a flexible tubular member, the plane positional relationship between the plunger and the valve body may be selected with a greater degree of freedom. Thus, this further facilitates the solenoid controlled valve for liquid preparation in the apparatus.

BRIEF DESCRIPTION OF THE DRAWINGS fig. 1 is a section view of a solenoid controlled valve for liquid preparation in accordance with a first embodiment of the present invention;

DETAILED DESCRIPTION OF THE PREFERRED EMBODIMENTS

The following description will discuss in detail the present invention with reference to the attached drawings. For convenience's sake, the description will be made of an application where, in an automatic liquid dye preparing apparatus, the solenoid controlled valve for liquid preparation of the present invention is used as mounted on the source liquid supply pipe for supplying a source liquid from the source liquid bottle to the trial dyeing pot and where the source liquid is controlled in outflow.

Figure 1:
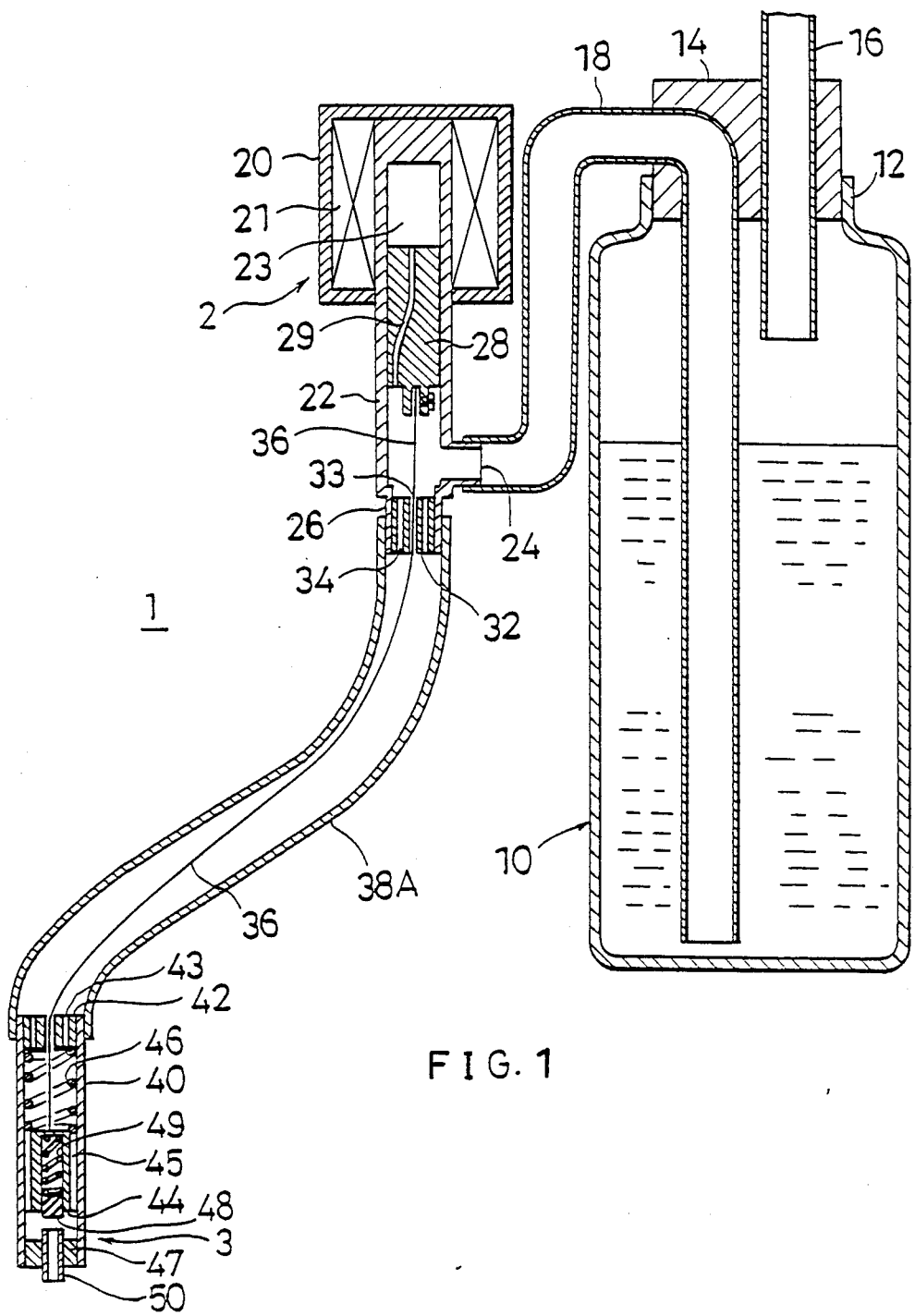
Figure 2:
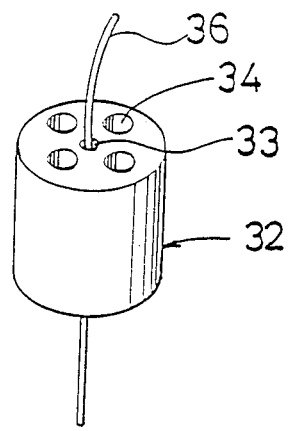
FIG. 2 is an enlarged perspective view of an upper guide of the valve in FIG. 1.
Figure 3:
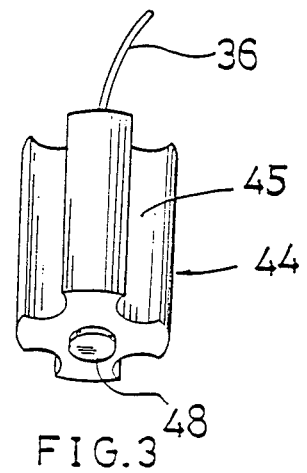
FIG. 3 is an enlarged perspective view of a sliding body and a valve body in the valve in FIG. 1.

The solenoid controlled valve for liquid preparation in accordance with a first embodiment of the present invention will be first discussed with reference to FIG. 1 to FIG. 3.

A source liquid bottle 10 containing a source liquid, i.e., a liquid dye used for liquid preparation, has a neck 12 surrounding a mouth into which a joint 14 is fitted. An air pipe 16 for supplying a compressed air for forcing the liquid out of the bottle 10 and a source liquid supply pipe 18 for supplying the source liquid from the source liquid bottle 10 to a trial dyeing pot (not shown), pass through the joint 14.

The air pipe 16 has one end which opens inside of the source liquid bottle 10 at the upper portion thereof, and the other end connected to a compressor (not shown) for generating compressed air.

The source liquid supply pipe 18 has one end which opens inside of the source liquid bottle 10 at the lower portion thereof, and the other end connected to an inlet port 24 of a solenoid controlled valve for liquid preparation 1, to be discussed later.

At the side of the source liquid bottle 10 at the upper portion thereof, the solenoid controlled valve for liquid preparation 1 has an electromagnetic drive unit 2 comprising a coil 21 and a plunger 28 disposed therein.

The coil 21 is supported by a housing 20 which surrounds the coil 21 and supports a case 22 disposed inside of the coil 21. The case 22 has a closed top. The case 22 is provided at the lower peripheral wall thereof with the projecting inlet port 24. The case 22 is further provided at the lower end thereof with an outlet port 26 of which diameter is slightly smaller than that of the case 22. The inlet port 24 is connected to the other end of the source liquid supply pipe 18 above-mentioned. The source liquid flows inside of the case 22 through the inlet port 24.

A plunger 28 is vertically slidably disposed inside of the case 22. When an electric current flows in the coil 21, the plunger 28 is adapted to be pulled up by an electromagnetic force generated in the coil 21. The plunger 28 has a through-hole 29 vertically extending inside thereof. Through the through-hole 29, the source liquid may flow into and from the upper portion of the plunger 28. Such arrangement makes it possible to maintain constant the pressure of the liquid in the upper portion 23 of the plunger 28 inside of the case 22. This assures a smooth vertical movement of the plunger 28.

An upper guide 32 is fitted inside of the outlet port 26. The upper guide 32 is provided in the center thereof with a wire hole 33 and a plurality of communication holes 34 around the wire hole 33. The source liquid may freely flow down from the inside of the case 22 through the wire hole 33 and the communication holes 34.

A vertically lengthened valve case 40 is disposed under the case 22, of which outlet port 26 is connected to the upper end of the valve case 40 by a resilient tube 38A. Fitted in the upper end of the valve case 40 is a lower guide 42 of which shape is similar to that of the upper guide 32. The source liquid flowing down from the case 22 through the inside of the tube 38A, may flow inside of the valve case 40 through communication holes 43 in the lower guide 42.

A sliding body 44 is vertically movably disposed under the lower guide 42 inside of the valve case 40. The sliding body 44 is provided in the center thereof with a hollow portion of which lower portion is opened. The sliding body 44 is further provided in the peripheral wall thereof with a plurality of vertically extending communication grooves 45. The source liquid flowing inside of the valve case 40 through the communication hole 43 in the lower guide 42, may flow down to the lower portion of the sliding body 44 through the communication grooves 45.

A wire 36, as a linear member, is inserted in and passes through the tube 38A. The wire 36 extends upward through the wire hole 33 in the upper guide 32, and is secured, at the upper end thereof, to the lower end of the plunger 28 with a bolt. The wire 36 also extends downward through the wire hole in the lower guide 42, and is secured, at the lower end thereof, to the upper end of the sliding body 44.

Disposed between the lower guide 42 and the sliding body 44 is a coil spring 46 for biasing the sliding member 44 downward.

A resilient valve body 48 is fitted in the lower end of the hollow portion of the sliding body 44, and a small-size coil spring 49 is mounted in the hollow portion on the valve body 48. The valve body 48 is biased slightly downward by the coil spring 49.

Through packing 47, a nozzle 50 is attached to the lower end of the valve case 40 at such position that the valve body 48 comes in contact with the upper end of the nozzle 50 serving as a valve seat when the sliding body 44 is moved downward. Accordingly, when the sliding body 44 is moved downward, a valve unit 3 including the valve body 48 and the valve seat is then closed.

In the solenoid controlled valve for liquid preparation 1 having the arrangement above-mentioned, when no electric current flows in the coil 21, the valve body 48 pressingly comes in contact with the upper opening of the nozzle 50 serving as the valve seat, by the spring-load of the coil spring 46. This prevents the source liquid from flowing out from the lower end of the nozzle 50 to the outside. When an electric current flows in the coil 21, the plunger 28 is pulled up by an electromagnetic force generated at the coil 21. This causes the wire 36 to be pulled up, causing the sliding body 44 and the valve body 48 to be moved upward. When the valve body 48 is moved upward, the upper end of the nozzle 50 is opened, causing the source liquid to flow out from the lower end of the nozzle 50 to the trial dyeing pot (not shown).

The inner peripheral surface of the tube 38A and/or the outer peripheral surface of the wire 36 may be coated with fluoroplastics such as Teflon (trade name). Such coating not only prevents wear of the wire 36, but also assures a smooth vertical movement of the wire 36 in the tube 38A.

The following description will discuss the results achieved at the time when the solenoid controlled valve for liquid preparation 1 in accordance with the first embodiment of the present invention, is used in an automatic liquid dye preparing apparatus.

In the automatic liquid dye preparing apparatus, it is required that 80 or more pieces of the source liquid bottle 10 are disposed side by side and the lower ends of the source liquid supply pipes 18 are gathered together above the trial dyeing pot. When opening or closing the source liquid supply pipes 18 with the use of conventional solenoid controlled valves for liquid preparation, the bulk of the coils 21 makes it impossible to densely dispose the solenoid controlled valves for liquid preparation. Accordingly, the source liquid supply pipes attached at the lower ends of the solenoid controlled valves have been turned and some distance extended. Then, the pipes have been bound together. Thus, the requirements above-mentioned have been satisfied.

However, when the source liquid supply pipes are lengthened, the liquid dyes remaining in the pipes may be dried and solidified. If the apparatus is repeatedly used, the liquid dyes flowing into the trial dyeing pot may become inaccurate in amount.

When the solenoid controlled valves for liquid preparation 1 of the present invention are connected to the source liquid supply pipes, about 80 to 100 pieces of the valve case 40 having a small diameter may be bound together in a relatively small binding diameter. This enables the valve cases 40 to be gathered together in a compact manner above the trial dyeing pot.

Figure 4:
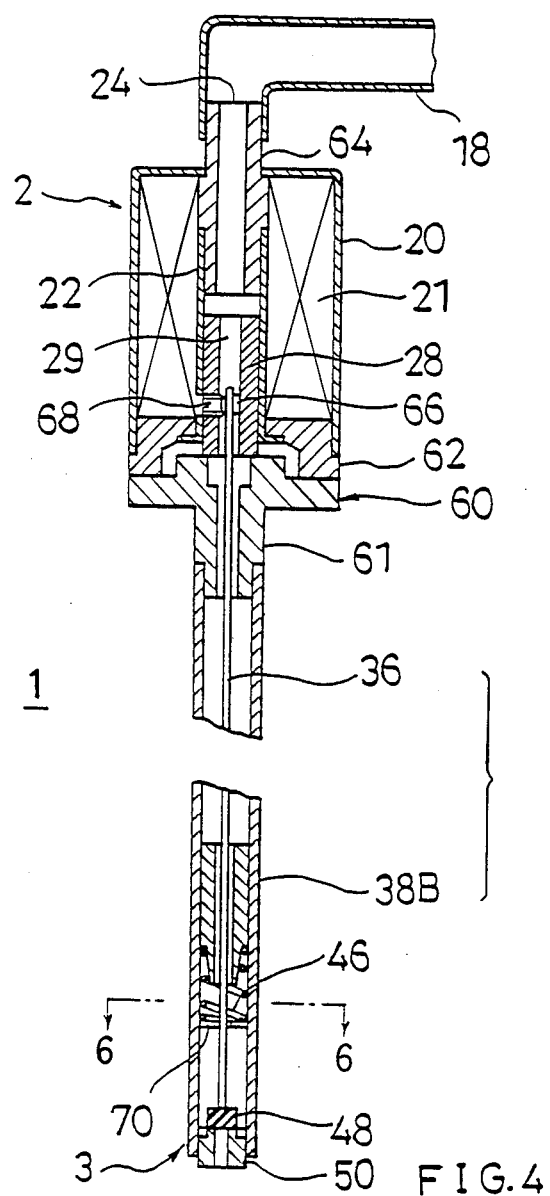
FIG. 4 is a section view of a solenoid controlled valve for liquid preparation in accordance with a second embodiment of the present invention.
Figure 5:
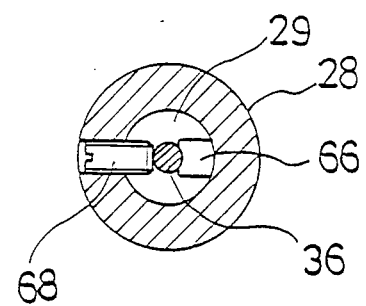
FIG. 5 is an enlarged transverse section view of a plunger in the valve in FIG. 4.
Figure 6:
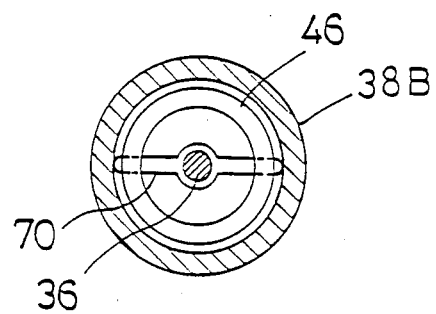
FIG. 6 is an enlarged section view taken along the line 6—6 in FIG. 4.

The following description will discuss the solenoid controlled valve for liquid preparation in accordance with a second embodiment of the present invention, with reference to FIG. 4 to FIG. 6. In the following description, only the points different from the first embodiment will be discussed.

A housing 20 is supported by a body 60 disposed thereunder, through a lower core 62. When the body 60 is attached to an apparatus on which the solenoid controlled valve for liquid preparation 1 is to be mounted, the housing 20 is supported in the apparatus.

A cylindrical upper core 64 is fitted in the upper portion of the housing 20, and provided at the upper end thereof with an inlet port 24. Through the inlet port 24, a source liquid flowing in a source liquid supply pipe 18, flows into a case 22.

A plunger 28 is provided in the center thereof with a communication hole 29. As shown in FIG. 5, a wire 36 is held by and between a projection 66 and a bolt 68 inside of the communication hole 29, causing the wire 36 to be secured to the plunger 28.

Unlike the first embodiment, the second embodiment does not have the upper guide 32, and the wire 36 is guided by a case-like projection 61 disposed at the lower end of the body 60.

In the second embodiment, a long tube 38B is disposed instead of the tube 38A as used in the first embodiment. The tube 38B has an upper end directly connected to the projection 61 of the body 60.

In the solenoid controlled valve of the second embodiment, the sliding body 44 in the first embodiment is not disposed, and the wire 36 is directly connected to a valve body 48. Accordingly, as shown in FIG. 4 and FIG. 6, a coil spring 46 biases the valve body 48 downward through a contact rod 70 projectingly disposed at the intermediate portion of the wire 36, unlike the first embodiment in which the coil spring 46 biases the valve body 48 through the sliding body 44.

When the plunger 28 is connected to the valve body 48 by the resilient wire 36, it is not required that the sliding direction of the plunger 28 be coaxial with the moving direction of the valve body 48. This enables to increase the distance between a coil 21 and the valve body 48. Accordingly, when the tubes 38B having a variety of lengths are combined, it is possible to arrange the nozzles 50 on the same plane while the coils 21 are positionally shifted in a vertical direction. Thus, a plurality of the tubes 38B may be gathered together even though the coils 21 are bulky.

In the embodiments above-mentioned, the plunger 28 is connected to the valve body 48 by the wire 36 as a linear member. However, the linear member is not limited to such wire 36, but other suitable means may be used. A flexible linear member is more preferable. The material of the linear member may be metal, synthetic resin or the like. Not only one wire, but also a cable including, in combination, a plurality of slender wires may be used.

The solenoid controlled valve for liquid preparation in accordance with the present invention may be advantageously used for controlling the flow of a fluid such as a liquid dye, a chemical solution, a medical fluid, alcohols such as wine, a perfume, a coating fluid, resin, adhesive, drink, foods. In particular, this valve may be advantageously used when such control in the flow of a variety of fluids is made by a remote control using a computer or the like.

What is claimed is:

1. The combination of a source of a liquid and a solenoid controlled valve for controlling the flow of the liquid comprising:
    an electromagnetic drive unit including a plunger to be driven by an electromagnetic force generated by a coil; and
    a valve unit separated from said electromagnetic drive unit and including a valve body pressingly contacted with a valve seat by a spring;
    said electromagnetic drive unit and said valve unit being connected to each other by a tubular member,
    said valve unit being disposed at the tip end of said tubular member,
    said valve body and said plunger being connected to each other by a linear member inserted in and passing thorugh the inside of said tubular member;
    and means defining a conduit communicating between the liquid source and the tubular member for supplying the liquid from the source to the tubular member.

2. The combination as set forth in claim 1 wherein the linear member is flexible.

3. The combination as set forth in claim 1 wherein the tubular member is flexible.

4. The combination as set forth in claim 2, wherein the tubular member is flexible.

* * * * *

UNITED STATES PATENT AND TRADEMARK OFFICE
CERTIFICATE OF CORRECTION

PATENT NO. : 4,978,101
DATED : December 18, 1990
INVENTOR(S) : Toshitaka Nakaya and Kenji Sumida It is certified that error appears in the above-identified patent and that said Letters Patent is hereby corrected as shown below:

ON TITLE PAGE: Item [54]

In the title, "OFR" should be --FOR--.

Signed and Sealed this

Twelfth Day of May, 1992

Attest:

DOUGLAS B. COMER

*Attesting Officer*  *Acting Commissioner of Patents and Trademarks*